April 21, 1942.  R. C. TALBOT  2,280,730
BOTTLE STAMPER
Filed Aug. 3, 1940   12 Sheets-Sheet 1
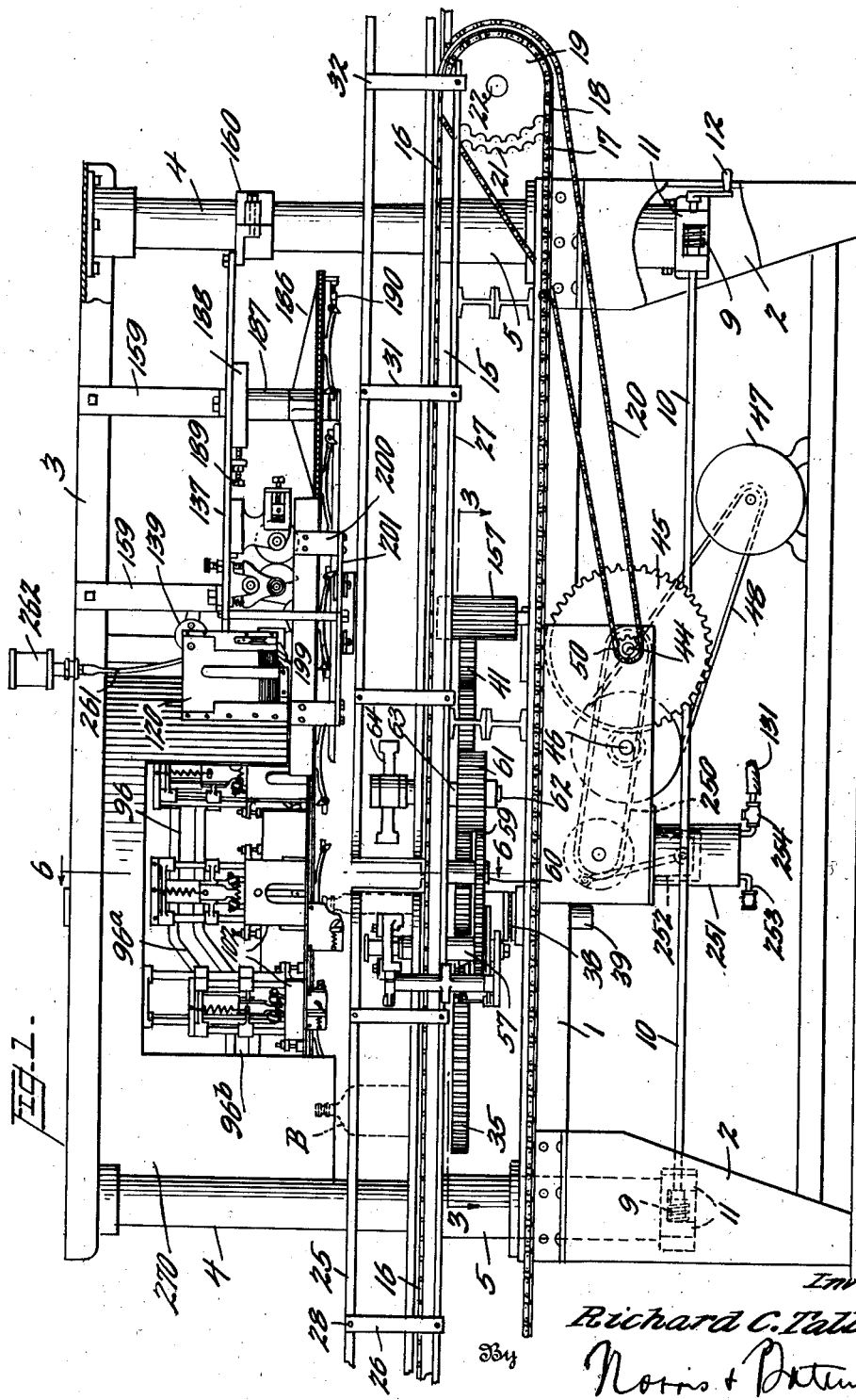

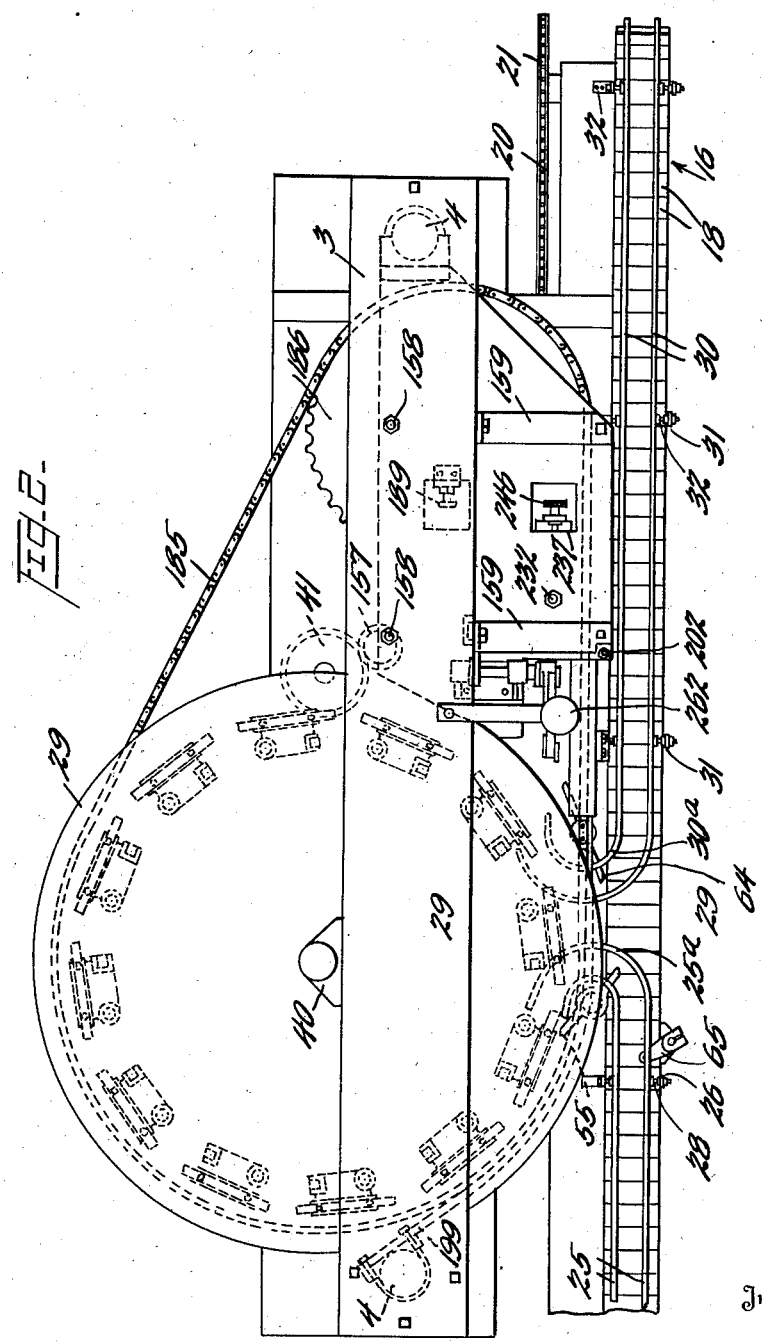

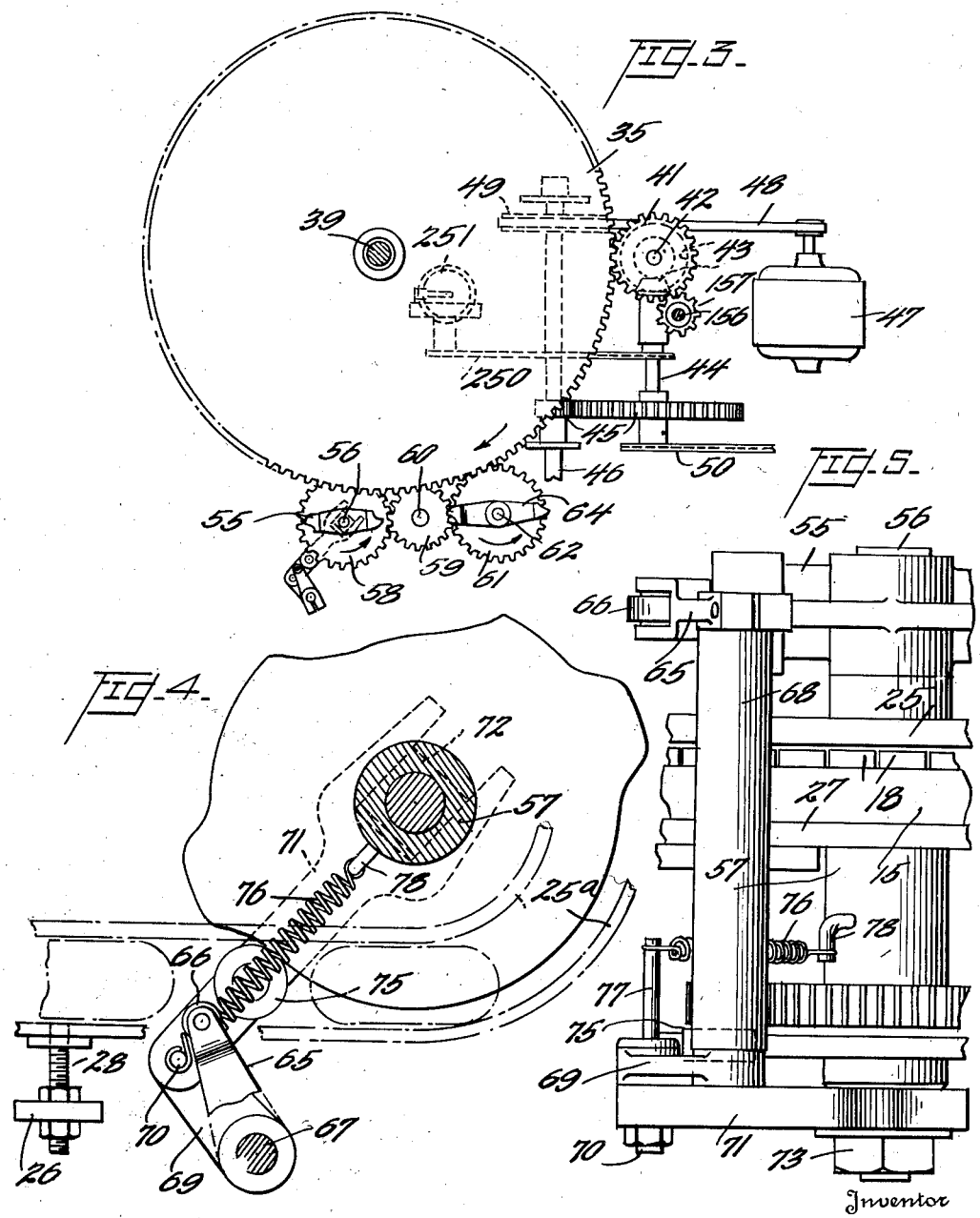

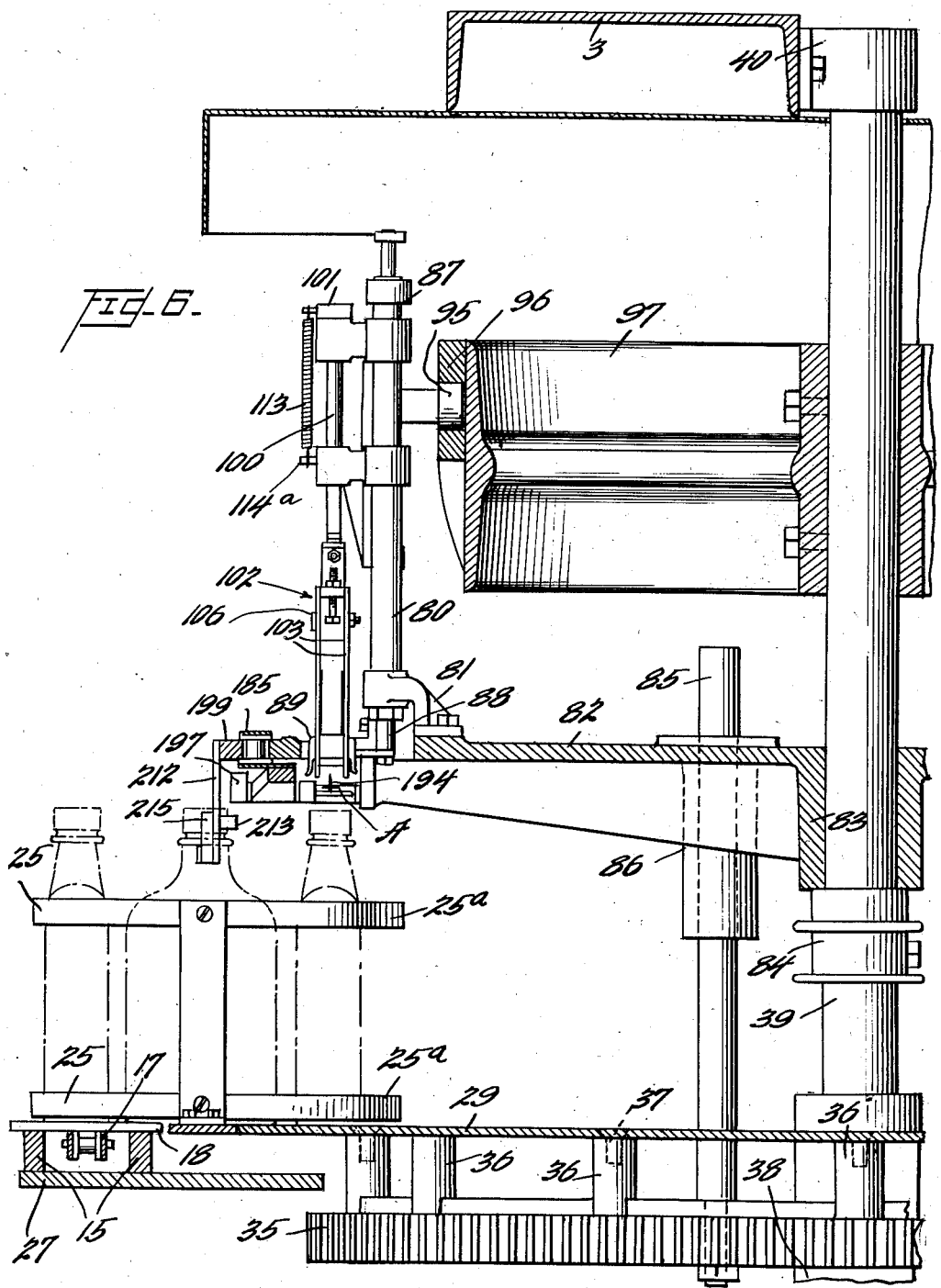

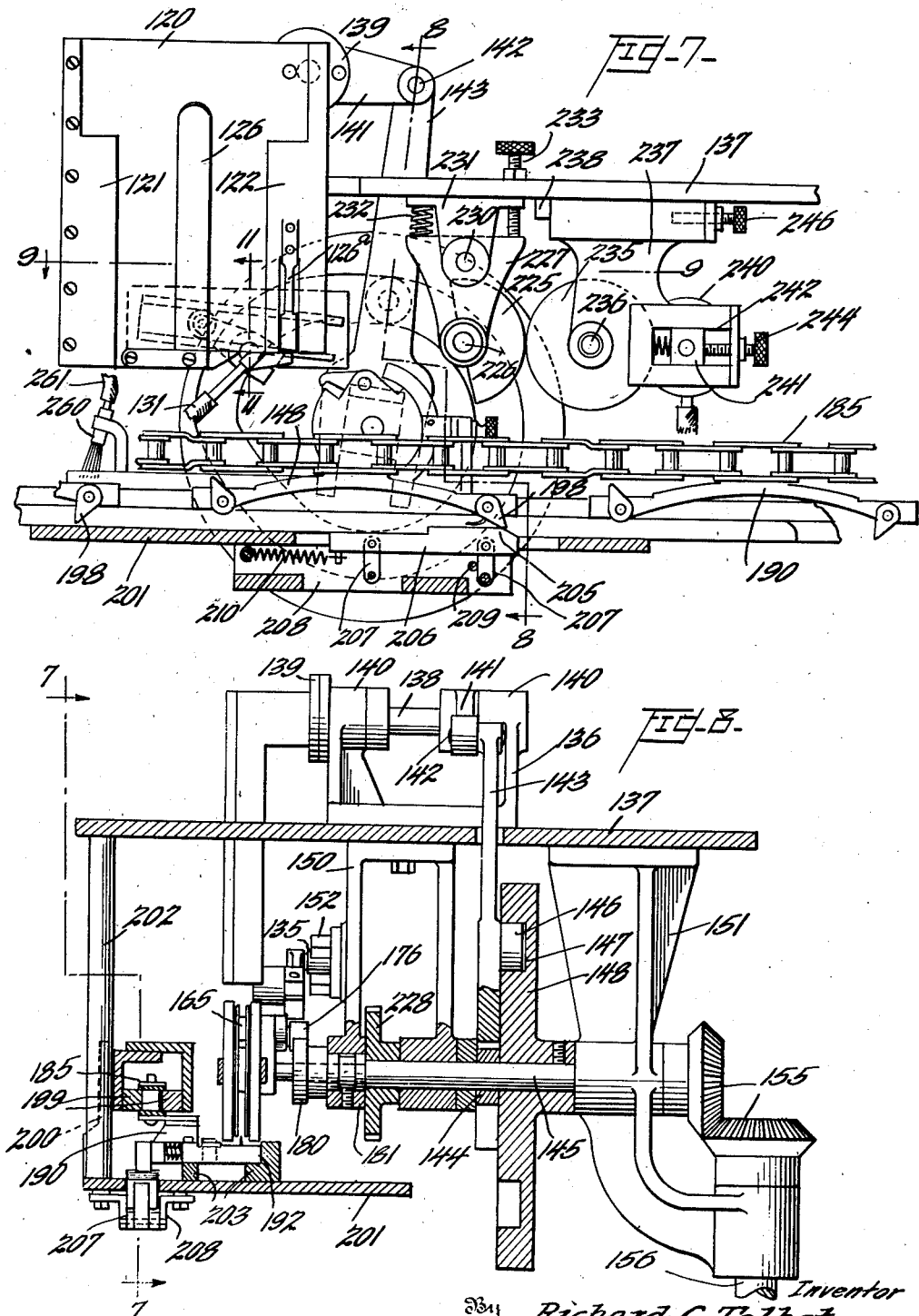

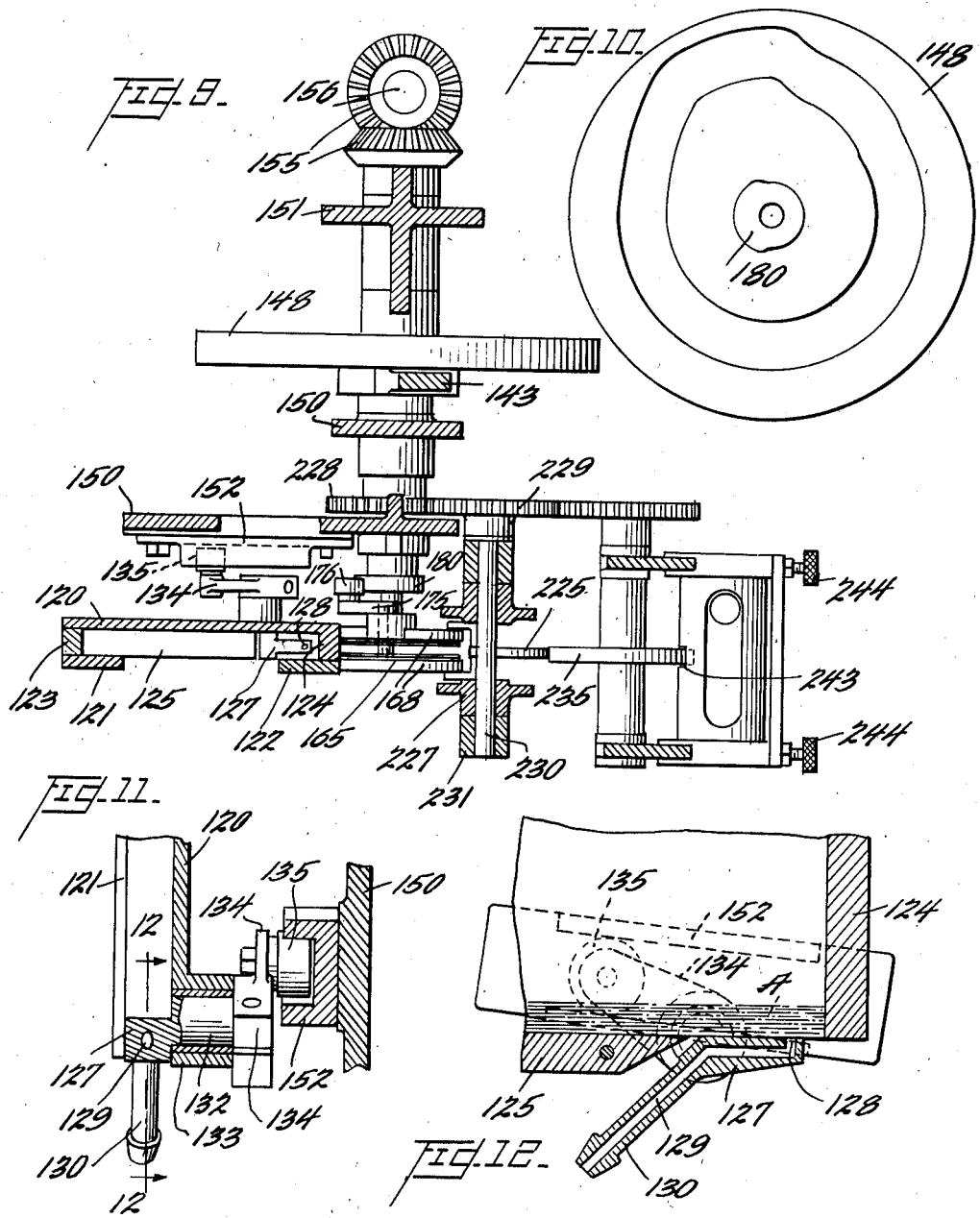

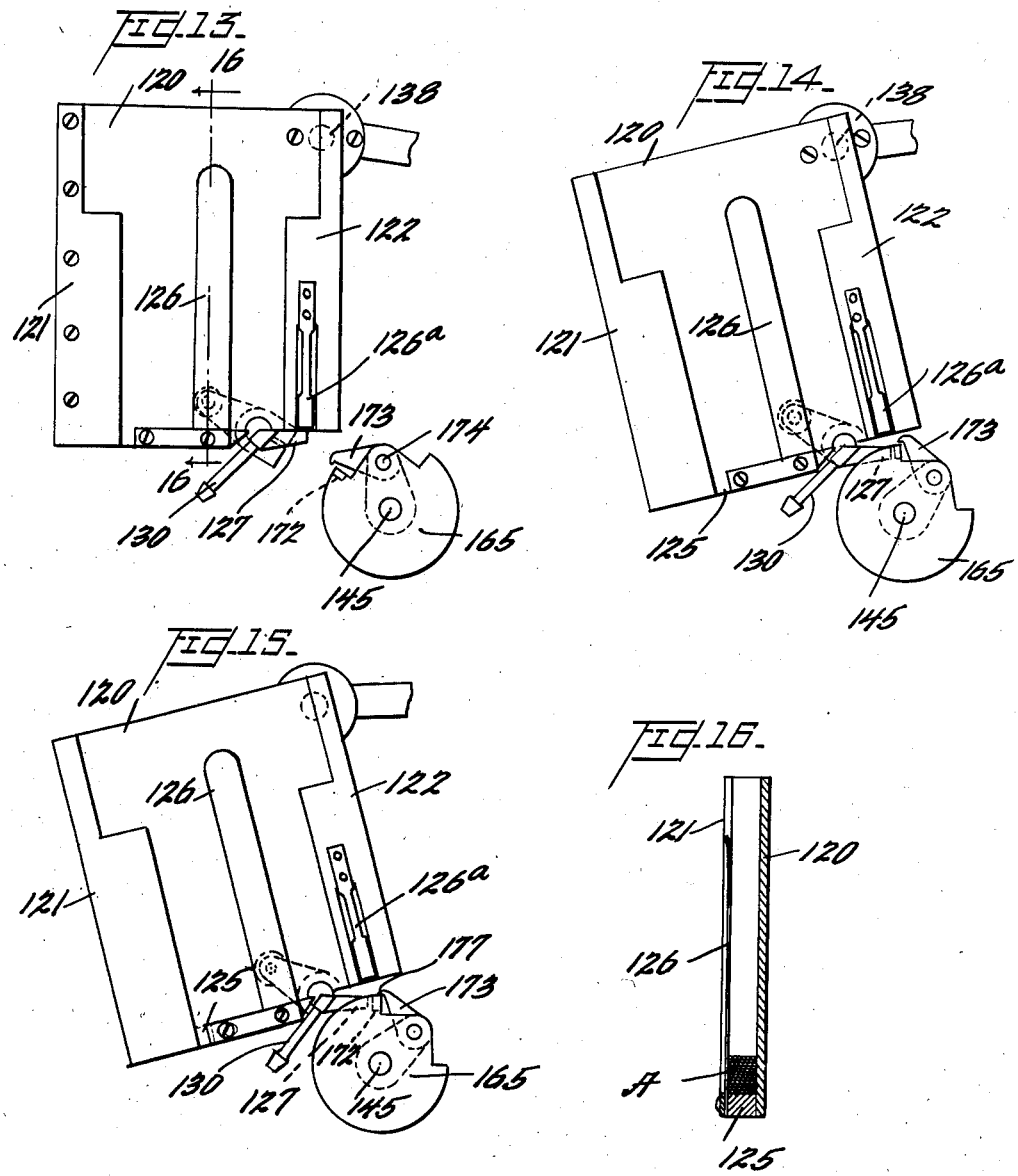

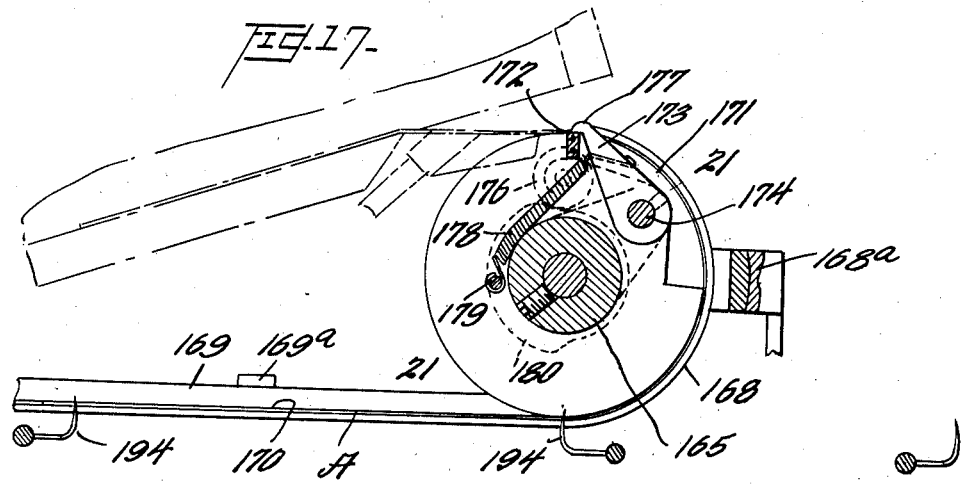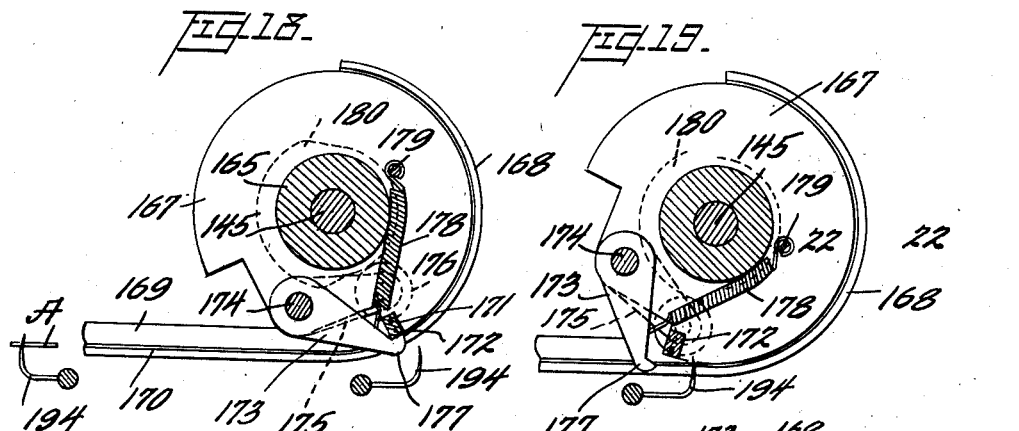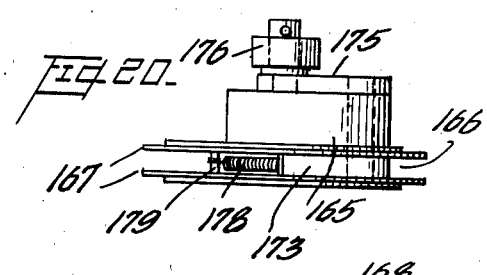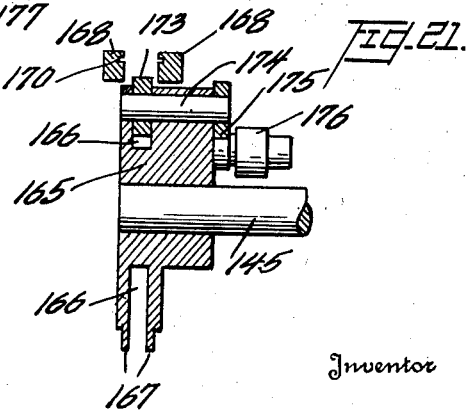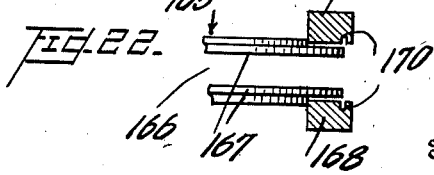

April 21, 1942. R. C. TALBOT 2,280,730
BOTTLE STAMPER
Filed Aug. 3, 1940 12 Sheets-Sheet 9
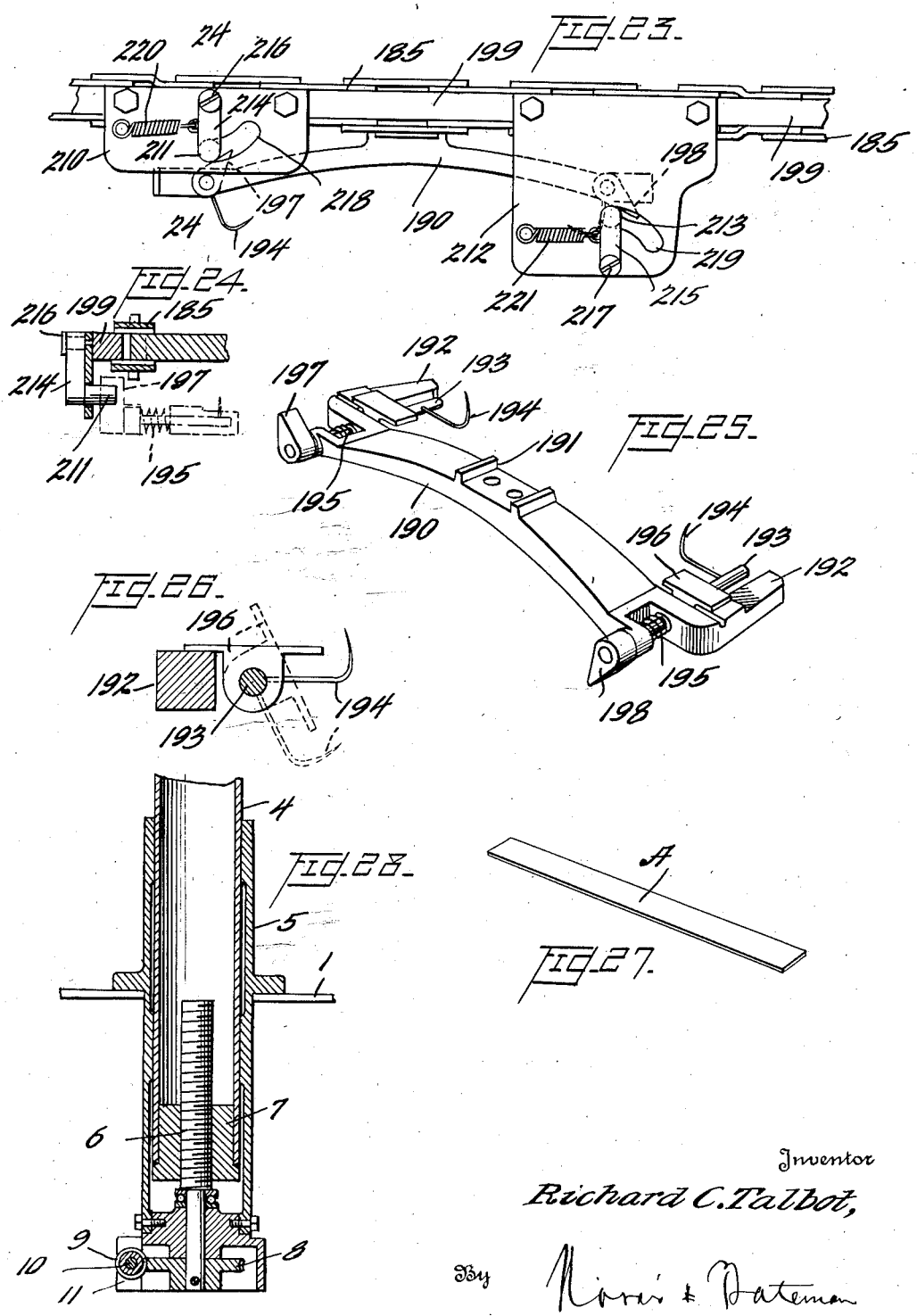
Inventor
Richard C. Talbot,
By Norris & Bateman
Attorneys

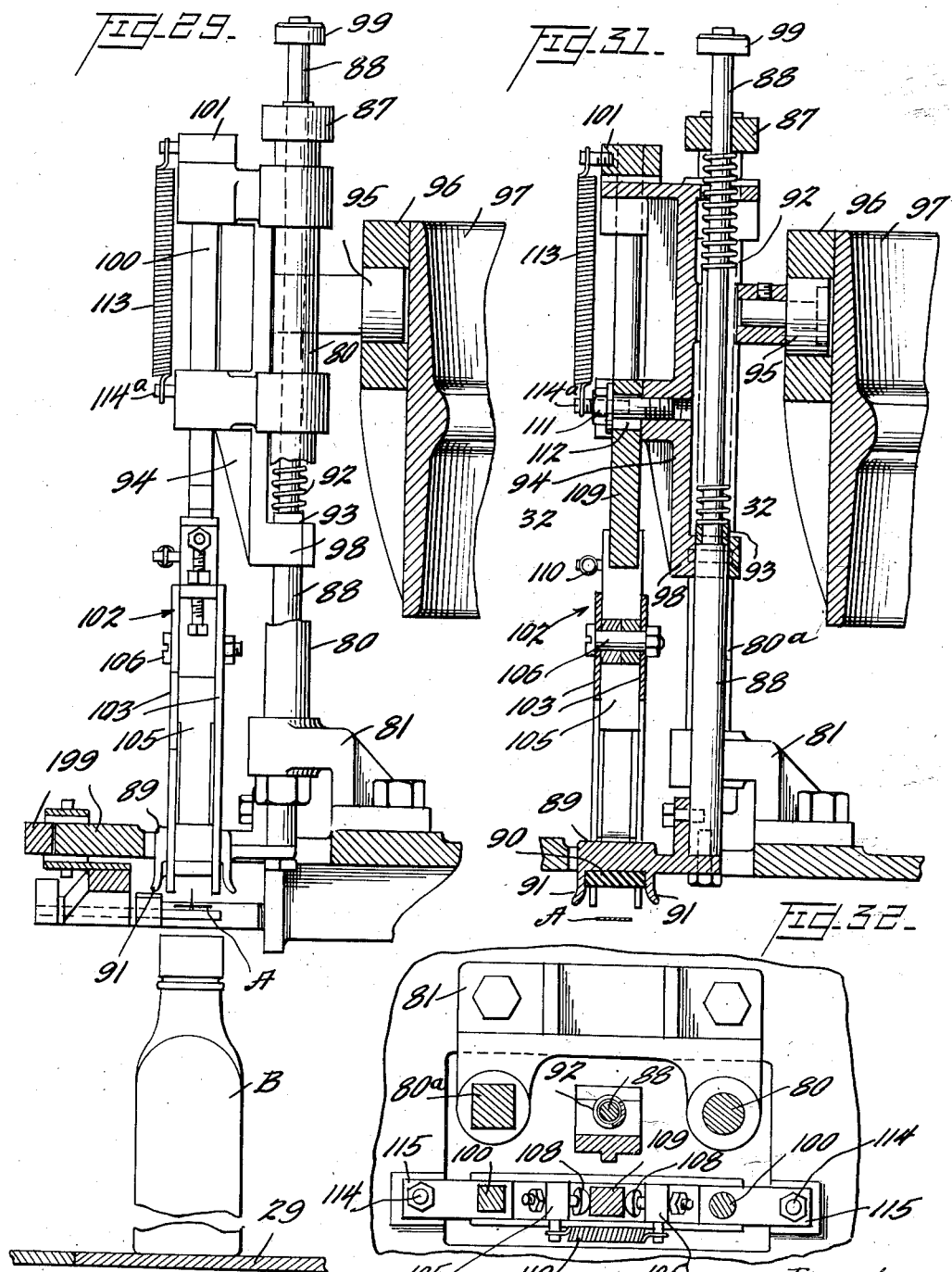

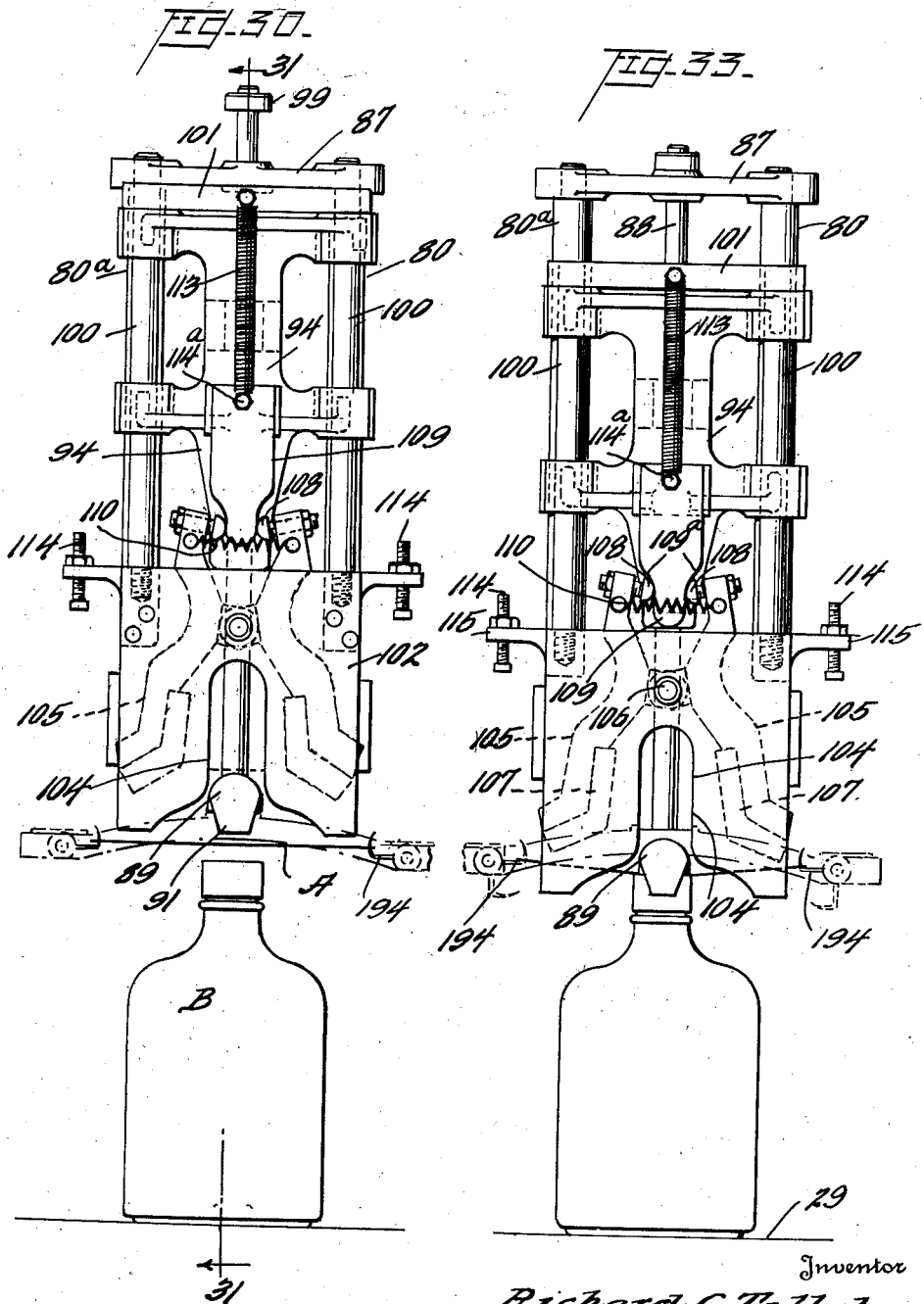

April 21, 1942.  R. C. TALBOT  2,280,730.
BOTTLE STAMPER
Filed Aug. 3, 1940  12 Sheets-Sheet 12
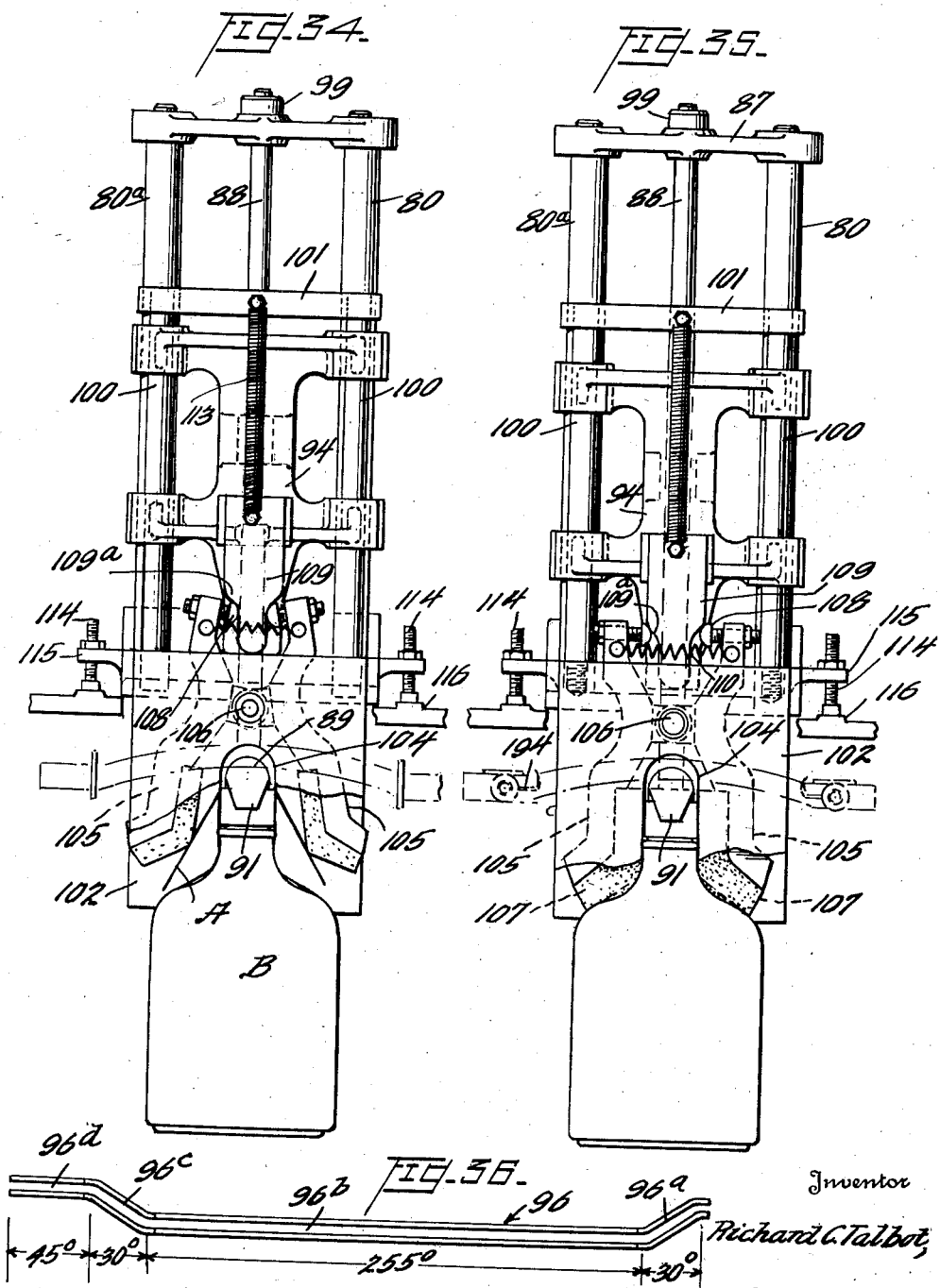
Inventor
Richard C. Talbot,
By Norris & Bateman
Attorneys Patented Apr. 21, 1942

2,280,730

UNITED STATES PATENT OFFICE 2,280,730

BOTTLE STAMPER

Richard C. Talbot, Durham, N. C., assignor to Wright's Automatic Tobacco Packing Machine Company, Durham, N. C., a corporation of North Carolina Application August 3, 1940, Serial No. 350,782

29 Claims. (Cl. 216—55)

The present invention relates to improvements in stamping machines, and more especially to those of the class adapted to apply and affix revenue or similar stamps across the tops of bottles.

One of the primary objects of the invention is to provide a novel stamping machine which is capable of rapidly and automatically applying stamps to the tops of bottles so that the ends of the stamps extend down evenly and in parallelism along the sides of the necks of the bottles and are firmly affixed thereto.

Another object is to provide an automatic stamping machine of this class in which the mechanisms for advancing the bottles, feeding the stamps and applying the stamps to the bottles are so organized and coordinated that these operations may be performed while the machine operates continuously and the bottles advance uninterruptedly, thus enabling the machine to operate smoothly and rapidly and to stamp a large number of bottles per unit of time.

Another object of the invention is to provide a stamping machine in which the stamps applied to the bottles are maintained under pressure against the bottles as the latter continue to advance through the machine, thereby insuring firm affixing of the stamps to the bottles prior to their discharge from the machine.

Another object is to provide novel means for feeding stamps from a magazine, applying adhesive thereto, and transferring them to means for conveying the stamps to the stamp affixing devices.

Another object is to provide novel means for conveying the stamps to the bottles, and means for accurately positioning the stamps across the top of the bottles so that they will be affixed evenly and uniformly thereto by the stamp affixing devices.

Another object is to provide novel and improved stamp affixing devices which are capable of pressing and affixing the stamps into intimate and adhering contact with the somewhat irregular surfaces at the mouths and along the adjacent portions of the necks of the bottles.

A further object is to provide a bottle stamping machine of a novel construction whereby it may be readily adjusted for the stamping of bottles of different sizes or heights.

To these and other ends, the invention consists in certain improvements and combinations and arrangements of parts, all as will be hereinafter more fully described, the features of novelty being pointed out more particularly in the claims at the end of this specification.

In the drawings:

Fig. 1 is a front elevation of a bottle stamping machine constructed in accordance with the present invention;

Fig. 2 is a top plan view of the machine as shown in Fig. 1;

Fig. 3 is a detail view of the driving means for the machine, this view being a horizontal section taken on the line 3—3 in Fig. 1;

Fig. 4 is a detail view, on an enlarged scale, of the escapement which controls the entrance of the bottles into the machine;

Fig. 5 is an elevation of Fig. 4 as viewed from the lower side thereof;

Fig. 6 is a vertical section through a portion of the turntable and one of the stamping devices which stamp the bottles while they are supported and advanced by the turntable, the section being taken on the line 6—6 in Fig. 1;

Fig. 7 is an elevation, on an enlarged scale and partly in section, of the stamp feeding and gumming mechanism and a portion of the stamp transferring means which conveys the stamps to the bottles on the turntable;

Fig. 8 is a vertical section taken on the line 8—8 in Fig. 7;

Fig. 9 is a horizontal section taken on the line 9—9 in Fig. 7;

Fig. 10 is a diagrammatic view showing the relative timing of the cams which oscillate the stamp magazine and control the operation of the stamp gripper;

Fig. 11 is a detail vertical section taken through the lower portion of the stamp magazine on the line 11—11 in Fig. 7;

Fig. 12 is a detail vertical section taken on the line 12—12 in Fig. 11;

Figs. 13, 14 and 15 are detail views of the stamp magazine and stamp gripper, showing the successive relative positions of these parts while removing the stamp from the magazine and engaging it with the gripper;

Fig. 16 is a detail vertical section through the stamp magazine, taken on the line 16—16 in Fig. 13;

Figs. 17, 18 and 19 are detail vertical sections through the stamp gripper, on an enlarged scale, showing diagrammatically the manner in which the gripper removes a stamp from the magazine and delivers it to the stamp transferring means;

Fig. 20 is a top plan view of the stamp gripper;

Fig. 21 is a detail section taken on the line 21—21 in Fig. 17;

Fig. 22 is a fragmentary detail section taken on the line 22—22 in Fig. 19;

Fig. 23 is a detail view of the mechanism cooperative with the stamp transferring means for releasing the stamp therefrom when positioned above a bottle on the turntable;

Fig. 24 is a cross section taken on the line 24—24 in Fig. 23;

Fig. 25 is a perspective view of one of the stamp carriers on the stamp transferring means;

Fig. 26 is a detail section taken longitudinally through one end of one of the stamp carriers, indicating by the dotted and full lines the operation of one of the stamp impaling pins;

Fig. 27 is a perspective view of a form of stamp which the machine is adapted to apply to bottles;

Fig. 28 is a detail vertical section through one of the devices for adjusting the machine for the stamping of bottles of different sizes or heights;

Fig. 29 is a vertical section on an enlarged scale and taken on the line 29—29 in Fig. 2, showing the position of one of the stamping devices at the station where the stamp is positioned over a bottle on the turntable;

Fig. 30 is an elevation of Fig. 29 as viewed from the left;

Fig. 31 is a vertical section taken on the line 31—31 in Fig. 30;

Fig. 32 is a horizontal section taken on the line 32—32 in Fig. 31;

Fig. 33 is a view similar to Fig. 30 but showing the presser head lowered to press the center of a stamp on the top of a bottle;

Figs. 34 and 35 are views similar to Figs. 30 and 33, but showing further stages in the operation of the stamp affixing device for affixing the ends of the stamp to opposite sides of the neck of the bottle; and Fig. 36 is a development of the cam which operates the stamp affixing device.

Similar parts are designated by the same reference characters in the different figures.

The machine comprises a main frame 1 of suitable form mounted on supporting legs 2, and an auxiliary frame 3 which is adjustable vertically relatively to the main frame to enable the machine to stamp bottles of different heights, as will be hereinafter described. The auxiliary frame 3, which comprises preferably a channel iron, is fixed to the upper ends of a pair of standards 4 which extend downwardly and are slidable vertically in bushings 5 secured on the main frame. The lower end of each bushing 5 has a screw 6 mounted therein for rotation on a vertical axis, each of these screws being threaded into a nut 7 fixed in the lower end of the respective standard 4, and the lower end of each screw has a worm wheel 8 pinned or otherwise fixed thereto, the worm wheels for both standards meshing respectively with worms 9 fixed on a shaft 10 which is journaled in suitable bearings 11 fixed to the lower ends of the bushings 5, and the shaft 10 is provided with a crank 12 by means of which it may be rotated. The shaft 10 thus serves as means for operating the screws 6 in unison to simultaneously raise or lower the standards 4 and the auxiliary frame 3 mounted thereon.

The main frame 1 provides a track 15, which extends longitudinally thereof, and a bottle conveyor 16, comprising an endless chain 17 having platforms 18 thereon for supporting the bottles, is arranged to travel longitudinally along this track in a direction from the left toward the right in Fig. 1. This conveyor chain passes around a driving sprocket 19 mounted in suitable bearings at one end of the main frame, this sprocket serving to drive this conveyor chain continuously in the direction stated, and at the other end this conveyor chain passes around an idler sprocket (not shown), suitably mounted on or adjacent to the machine. The sprocket 19 is driven continuously by a chain 20 which passes around a sprocket wheel 21 fixed on a shaft 22 to which the sprocket 19 is fixed.

The bottles, resting on the platforms of this conveyor chain are guided, as they are advanced thereby, by pairs of rails 25 between which the bottles travel as they are advanced by the conveyor, these rails being supported on brackets 26 which are fixed to a plate 27 which supports the conveyor track 15, the rails 25 being secured adjustably to the brackets 26 as by screws 28 which enable the transverse spacing of the rails to be adjusted to accommodate bottles of different diameters. The inner ends 25a of the rails 25 are curved inwardly to introduce the bottles to a turntable 29, the upper surface of which is on the same level with the upper bottle supporting surface of the bottle conveyor 16. Another pair of bottle guiding rails 30 are provided for guiding the bottles as they are discharged from the turntable and conveyed by the conveyor 16 to the delivery end of the machine. The rails 30 have curved portions 30a which extend outwardly from the turntable, and these rails are supported on brackets 31 which are fixed to the conveyor track supporting plate 27, the rails 30 being supported from the brackets 31 by screws 32 which provide means for adjusting the distance between the rails 30 to conform with bottles of different diameters. It will be understood that the travel of the bottle conveyor 16 from the left to the right of the machine as shown in Figs. 1 and 2 will advance the bottles entering the machine at the left to the turntable 29 and, after the bottles have been stamped and are discharged from the turntable, the bottle conveyor will continuously advance the stamped bottles to the discharge end of the machine where they may be received by a suitable table or other means for packing or other disposition.

The turntable 29 is composed preferably of a flat circular plate which is supported on and secured to the upper side of a horizontal gear wheel 35 by an annular series of bosses 36 on the gear wheel and to which the turntable is suitably secured as by screws 37 so that the turntable rotates in unison with this gear wheel. The gear wheel 35 is supported rotatably by its hub on the main frame 1 by a bearing 38 on which it rests and through which is slidable a shaft 39, the upper end of which is fixed to the auxiliary frame 3, as by a bracket 40. The gear 35 is driven by a gear 41 which is fixed on the upper end of a shaft 42, the latter being journalled in suitable bearings in the main frame, and the lower end of this shaft is connected by bevel gears 43 to a horizontal shaft 44 which is journalled in suitable bearings in the main frame. The shaft 44 is driven by suitable reduction gears 45 from a horizontal shaft 46, and the latter is driven continuously during the operation of the machine by any suitable means such as an electric motor 47 which may be connected by a belt 48 to a belt pulley 49 on the shaft 46. The shaft 44 also has a sprocket wheel 50 fixed thereon and around which the chain 20 for driving the bottle conveying chain 17 passes. Accordingly, the turntable and the bottle conveying chain will be driven continuously, and preferably the ratio of gearing is such as to cause the turntable and bottle conveyor to advance the bottles at the same speed.

The present invention provides novel means for introducing the bottles from the bottle conveyor 16 onto the turntable 37 so that they will be arranged in an annular series thereon and in properly spaced circumferential relation to be operated upon by an annular series of stamp affixing devices which are mounted above and rotated in unison with the turntable, and it also provides novel means for removing the stamped bottles from the turntable and returning them to the bottle conveyor 16 for discharge from the machine. The means for introducing the bottles onto the turntable, as shown in Figs. 1, 2 and 3, comprises a turnstile 55 embodying a pair of arms fixed to a shaft 56, the latter being mounted adjacent to the edge of the turntable and concentrically of the curved bottle guiding rails 25ª by a bearing 57 which is supported on the conveyor supporting plate 27. The shaft 56 has a gear 58 fixed on its lower end, this gear meshing with an idler gear 59 mounted on a stud 60 fixed to the underside of the conveyor supporting plate 27, and the idler gear 59 meshes with another gear 61 which is of the same diameter as that of the gear 58, the gear 61 having a sufficiently wide face to mesh also with the turntable gear 35 so that rotation of the turntable will rotate the gear 61 and also, through the idler gear 59, the gear 58 which operates the turnstile 55. The gear 61 is fixed on a shaft 62 which is journalled in a suitable bearing 63 supported on the conveyor supporting plate 27, and this shaft is concentric with the curved portions 30ª of the bottle guiding rails 30. The upper end of the shaft 62 carries a turnstile 64 comprising a pair of diametrically opposite arms. The diametrically opposite arms of the turnstile 55 operate in the bottle passageway between the curved portions 25ª of the bottle guiding rails and in a direction to advance the bottles through this passageway toward the turntable, and the diametrically opposite arms of the turnstile 64 operate in the passageway between the curved portions 30ª of the bottle guiding rails and in a direction to remove the bottles from the turntable. Since the gears 58 and 61 which operate both turnstiles are of the same diameter, the turnstiles will revolve at the same speed or in unison, and as they are driven from the gear 35 which rotates the turntable, they will operate in proper timed relation with the turntable. The arms of both turnstiles are of sufficient length to overlie the edge of the turntable so that the turnstile 55 will push the bottles onto the turntable and the turnstile 64 will engage the stamped bottles on the turntable and remove them therefrom. However, the arms of the turnstile 55 are preferably somewhat shorter than those of the turnstile 64 in order that each bottle, after it has been placed on the turntable and engaged by the respective stamp applying device, will advance with the turntable and the stamp affixing device at a somewhat higher speed than the peripheral speed of the turnstile 55, thereby insuring clearing of this turnstile by the bottle.

The present invention also provides novel escapement means for indexing the bottles as they advance to the turnstile 55. Such indexing means, as shown in detail in Figs. 4 and 5, comprises an escapement arm 65 having a roller 66 journalled in its end, the arm 65 being fixed to a vertical shaft 67 which is pivoted in a bracket 68 fixed to the conveyor supporting plate 27. An arm 69 is fixed to the lower end of the shaft 67, this arm being pivotally connected by a stud 70 to a cam yoke 71 which slidably engages a block 72 on the shaft 56 of the turnstile 55, the yoke being supported on the lower end of this shaft by a nut 73 threaded on said shaft. The gear 58 on the shaft 56 carries a cam 74, which may be mounted adjustably thereon to enable the escapement arm 65 to be timed accurately in relation to the turnstile 55, and the cam yoke 71 has a roller 75 journalled thereon and arranged to ride on the cam 74 and to follow said cam under the action of a tension spring 76 which connects a stud 77 on the arm 69 to a hook 78 on the bearing 57. By this arrangement, the roller 66 on the end of the escapement arm 65 will be normally held in the path of the bottles entering the machine between the guide rails 25 at a point immediately in advance of the turnstile 55. However, the cam 74 revolves with the turnstile 55 and it operates, through the cam yoke 71, to move the escapement arm 65 out of the path of the bottles successively and thereby space them in proper relation to be engaged successively by the turnstile 55. The cam 74 is set to allow the escapement arm to return to the path of the entering bottles immediately after a bottle has passed it, thereby causing the roller on the escapement arm to engage the front of the next following bottle. The roller 66 provides an anti-friction engagement between the escapement arm and the bottle so that the escapement arm may be easily disengaged from the bottle. The duration of the period during which the escapement arm is held out of the path of the bottles is made to conform with the speed of the conveyor which advances the bottles and the transverse width of the bottles.

According to the present invention, a suitable number of stamp affixing devices are mounted in an annular series above the turntable 29, these devices rotating in unison with the turntable and applying and affixing stamps to the tops of the bottles and holding the stamps firmly on the bottles until they become firmly affixed thereto before the bottles are discharged from the turntable. Each of these stamp affixing devices, as shown in detail in Figs. 29 to 35 inclusive, comprises a pair of vertical guide posts 80 and 80ª which are fixed at their lower ends to a bracket 81 which is bolted or otherwise secured to a sprocket wheel 82 which is of approximately the same diameter as that of the turntable 29 and is mounted above the turntable by its hub 83 which is rotatably mounted on the shaft 39 and is supported thereon by a collar 84 which is clamped or otherwise fixed to this shaft. Since the shaft 39 is fixed to the vertically adjustable auxiliary frame 3 so that it will move vertically when the auxiliary frame is adjusted vertically, and the sprocket wheel 82 rests on the collar 84 on this shaft, this sprocket wheel will be adjusted vertically relatively to the turntable 29 and will thereby adjust the stamp affixing devices vertically when the machine is adjusted for the stamping of bottles of different heights. The sprocket wheel 82 however is driven from the gear wheel 35 which rotates the turntable 29 by a suitable number of pins 85 which are bolted or otherwise fixed at their lower ends to the gear wheel 35, the upper ends of these pins extending slidably through bushings 86 fitted in the sprocket 82. By this arrangement, the sprocket wheel 82 will be driven from the gear wheel 35, and it will maintain its driving connection with said gear, although the machine may be adjusted for the stamping of bottles of different heights. A housing 270 is preferably employed to partially enclose the series of stamp affixing devices.

The guide posts 80 and 80ª of each stamping device are connected at their upper ends by a cross member 87, and a rod 88 is slidable through this cross member, the lower end of this rod having a head 89 fixed thereto, this head having a facing 90 of rubber or other suitable yielding material to engage the top or mouth of a bottle resting on the turntable and having flared flanges 91 at its opposite sides to engage and center the bottle mouth. The rod 88 is yieldingly pressed downwardly by a compression spring 92 which encircles it, this spring bearing at its upper end against the underside of the cross member 87 and bearing at its lower end on a collar 93 fixed to the rod 88. The guide posts 80 and 80ª also have a slide 94 mounted to reciprocate vertically thereon, this slide carrying a roller 95 which operates in a cam track 96 fixed on a circular support or wheel 97 which is clamped or otherwise fixed to the shaft 39 and is concentric therewith. However, as the shaft 39 is non-rotatable, the roller 95 of each stamp affixing device will travel around the cam 96 incident to the rotation of the turntable 29 and sprocket 82, thereby causing the slides 94 of the stamp affixing devices to reciprocate vertically and perform their stamp affixing operations in proper sequence. The slide 94, as shown in detail in Fig. 31, has a lower arm 98 on which the collar 93 on the rod 88 is adapted to rest so that while the slide 94 is in its elevated position the head 89 will be raised, and when the slide 94 is lowered, the head 89 will descend under the action of the spring 92. Descent of the head 89 however is limited by a collar 99 fixed on the upper end of the rod 88.

The slide 94 slidably supports a pair of rods 100 the upper ends of which are connected by a cross member 101, and the lower ends of these rods are fixed to a head 102 which comprises a pair of plates 103 which are spaced apart a distance sufficient to receive the stamp between them, these plates having a slot 104 therein in which the head 89 may operate and the lower edges of these plates are shaped to conform substantially with the shoulders of the bottle. A pair of presser arms 105 are mounted between the plates 103, they being pivotally supported between these plates by a pivot bolt 106, the lower portions of these presser arms being faced with pads 107 of soft rubber or other suitable yielding material and having a shape conforming substantially with the neck and adjacent portions of the shoulders of the bottles. The upper ends of the presser arms, above the pivot bolt, are provided with screws 108 which are adjustable in these arms, and a cam 109 mounted on the slide 94 is adapted to enter between these screws and thereby force the lower ends of the presser arms 105 toward one another. The upper ends of the presser arms 105 are drawn together by a tension spring 110 which connects them and holds the screws 108 in contact with the cam 109 so that when the cam is in its elevated position as shown in Figs. 30, 33 and 34 the yieldable pads 107 on the lower ends of the presser arms will be held in relatively separated relation for insertion over or removal from the upper portion of the bottle, and when the cam 109 is lowered relatively to the presser arms, the inclines 109ª on the cam will engage the screws 108 and spread them apart, thereby forcing the pads 109 on the presser arms toward one another and against the sides of the neck of the bottle. The cam 109 is preferably mounted for vertical adjustment on the slide 94, as by a clamping screw 111 which extends through a vertical slot 112 in the cam and is threaded into the slide 94. A tension spring 113 connects the cross member 101 fixed to the upper ends of the rods 100 to the slide 94, as by a pin 114ª fixed in the head of the screw 111, this spring acting to hold the presser arms 105 in their lowered position after being clamped to the sides of the neck of the bottle until after the cam 109 has been raised to permit relative separation of the pads 107 to release their pressure against the sides of the neck of the bottle and the ends of a stamp applied thereto. The extent of descent of the presser arms 105 relatively to a bottle on the turntable is limited by a pair of screws 114 which are threaded vertically in lugs 115 fixed between the plates 103, these screws being adjustable vertically and engageable at their lower ends upon stop surfaces 116 on the upper side of the sprocket 82 when the rods 100 carrying the presser arms 105 are fully lowered, as shown in Figs. 34 and 35.

Each of the stamp applying and affixing devices is of the same construction as that shown in Figs. 29 to 35 inclusive, and the operation of each of these devices is as follows: The stamp A, which may be in the form of a strip as shown in Fig. 27, is carried into position above the respective bottle B, by means hereinafter described, while the respective stamp applying and affixing device is in its relatively raised position as shown in Figs. 29 and 30, at which time the roller 95 is in the relatively raised portion of the cam 96, the stamp then lying immediately below the space between the flanges 91 of the head 89 and immediately below the space between the guide plates 103, as shown in Figs. 29 and 30. As the turntable 29 and the bottle thereon and also the stamp applying and affixing device rotate in unison, the roller 95 traverses the downwardly inclined portion 96ª of the cam 96, thereby lowering the slide 94 and the parts carried by it as from the position shown in Figs. 29, 30 and 31 to the position shown in Fig. 33, causing the head 89 to first engage the middle of the stamp and to press it on the top of the bottle as shown in Fig. 33. At this time, the pads on the lower ends of the presser arms 105 are in relatively separated relation and the plates 103 straddle or are at opposite sides of the stamp so that they guide the stamp ends and thus prevent lateral deflection thereof. At this point the ends of the stamp are released by their carrier, as will be hereinafter described. As the complete stamp applying and affixing device, excepting the head 89, descends further, the spring 92 is compressed, thereby pressing the head 89 firmly upon the middle of the stamp on the top or mouth of the bottle, and the complete stamp applying and affixing device continues its descent, thereby bringing the pads 107 on the presser arms 105 down along opposite sides of the bottle neck until the stop screws 114 come to rest on the stop surfaces 116 on the sprocket, at which time the presser arms reach their lowest position. During this descent of the presser arms, they engage the ends of the stamp which project from opposite sides of the bottle mouth and thereby deflect the ends of the stamp downwardly toward opposite sides of the bottle neck, as shown in Fig. 34, and during this operation, the ends of the stamp, which lie between the plates 103, are guided truly toward the sides of the bottle neck. Further descent of the slide 94, which takes place when the cam roller 95 reaches the lowest portion 96b of the cam 96, causes the cam 109 to descend relatively to the presser arms 105, thereby causing its inclined surfaces 109a to act on the screws 108 to spread apart the upper ends of the presser arms and consequently force together the pads 107 on the lower ends of the presser arms, these pads thereby acting on the ends of the stamp to press them firmly against the opposite sides of the bottle neck and thereby cause the stamp, which has been previously supplied with glue or other adhesive, to become firmly affixed to the opposite sides of the neck and the upper portions of the shoulders of the bottle, as shown in Fig. 35. The relatively soft or yielding nature of the pads 107 enables them to press all portions of the stamp ends into intimate contact with the more or less irregular surfaces of the bottle neck and shoulders, thereby insuring adhesion of all portions of the stamp to the bottle.

Each stamp applying and affixing device, as it travels around the cam 96 incident to the rotation of the turntable, remains in its fully lowered and clamping position as shown in Fig. 35, due to the travel of the roller 95 in the lowest portion 96b of the cam 96 until such device and the respective stamped bottle reach the discharge point for the turntable, whereupon the roller 95 traverses the upwardly inclined portion 96c of the cam 96. The slide 94 is thereby caused to ascend, first causing the cam 109 to rise while the presser arms 105 are still held down on the bottle by the tension of the spring 113. This ascent of the cam 109 releases its pressure on the screws 108, thereby permitting the spring 110 to retract the pads 107 from clamping engagement with the bottle neck, and as the slide 94 continues to rise, its upper end engages the cross arm 101 connecting the upper ends of the rods 100 carrying the presser arms 105, thereby carrying these presser arms upwardly, thus returning the parts of the device to the position shown in Fig. 33, and the final portion of the ascent of the slide 94, which occurs when the roller 95 reaches the highest portion 96d of the cam, causes the arm 90 on the slide to pick up the collar 93 on the rod 88, thereby lifting the head 89 from the bottle mouth and returning the parts of the device to the position shown in Figs. 29, 30 and 31. By maintaining the presser arms 105 in clamping relation with the ends of the stamp lying against the sides of the bottle neck during the relatively large portion of the rotation of the turntable during which the roller 95 is travelling in the relatively long lower portion 96b of the cam 96, firm affixing of the stamp to the bottle is insured before the stamped bottle is discharged from the turntable.

The present invention provides novel means for feeding the stamps from a magazine, transferring them to the stamp applying and affixing devices, and releasing the stamps for application to the bottles, these parts of the machine being shown most clearly in Figs. 7 to 27 inclusive.

The stamps A, in the form of strips as shown in Fig. 27, are placed in stacked relation in a magazine which, as shown, comprises a rear wall 120, front wall sections 121 and 122 which form a vertical slot between them, edge walls 123 and 124, and a bottom wall 125, these walls forming a receptacle of a shape to receive and hold a stack of the stamps. The upper ends of the front walls 121 and 122 may be cut away as shown in Fig. 7 to facilitate the insertion of stacks of stamps into the magazine, and the stamps may be retained from displacement in the magazine by a spring finger 126 the lower end of which is fixed to the bottom wall 125 and the upper portion of which extends vertically between the front plates 121 and 122 and is engageable yieldingly against the edges of the stack of stamps in the magazine, the stamps resting on the bottom wall 125. The bottom wall 125 terminates short of the wall 124, thus providing an opening through which the lowermost stamps in the stack may be removed successively from the magazine, and a suction plate 127 is mounted in this opening, this suction plate having a suction aperture 128 which is open at the upper side of the plate so that it will underlie a stamp resting on the suction plate, the suction plate having a passageway 129 therein leading from the suction opening 128 to a nipple 130 to which a flexible suction hose 131 may be attached. The suction plate, as shown in detail in Fig. 11, is mounted on a shaft 132 which is journalled in a bearing 133 formed in or attached to the lower portion of the magazine plate 120, and this shaft has an arm 134 clamped or otherwise fixed thereon, this arm carrying a roller 135 which controls the operation of the suction plate relatively to the magazine. The magazine is pivoted at its upper corner above the suction plate to a relatively fixed bracket 136 which may be bolted or otherwise secured to a supporting plate 137, by a shaft 138 which is fixed by a flanged coupling 139 to said upper corner of the magazine. The shaft 138 is journalled to rotate in bearings 140 in the bracket 136 and it has an arm 141 fixed thereon and pivotally connected by a pin 142 to the upper end of a cam yoke 143. The lower end of this cam yoke straddles and is guided by a block 144 mounted loosely on a shaft 145, and the cam yoke carries a roller 146 which operates in the cam track 147 of a cam 148, the latter being suitably fixed to the shaft 145 to rotate therewith and operating to swing or oscillate the magazine to and fro about the shaft 138 as an axis. The shaft 145 is mounted in bearings in brackets 150 and 151 which are bolted or otherwise secured to the underside of the plate 137, and the bracket 150 has a cam 152 fixed to a side thereof, the roller 135 on the arm 134 attached to the suction plate operating in this cam and thereby controlling the operation of the suction plate. The cam 152 may be of rectilinear form and inclined as shown in Figs. 7 and 12 at such an angle that the upper face of the suction plate 127 will be maintained in a horizontal position, or substantially so, during the to and fro oscillation of the magazine by the shaft 138, as shown diagrammatically in Figs. 13 to 16 inclusive. The shaft 145 is driven continuously through bevel gears 155 from a shaft 156 the upper end of which is journalled in a bearing in the bracket 151, and the shaft 156 is driven continuously by a pinion 157 which is fixed thereon and meshes with the gear 41 which drives the turntable, as shown in Figs. 1 and 3. The plate 137 which carries the stamp feeding mechanism, including its operating shaft 145 and the driving shaft 156, is fixed by rods 138 and braces 159 to the auxiliary vertically adjustable frame 3, and it may be further secured firmly, as by a split clamp 160, to the adjacent vertically movable standard 4 so that this plate 137 and the stamp feeding mechanism and related parts will be adjusted vertically when the auxiliary frame is adjusted to accommodate the machine to bottles of different heights. The driving pinion 157 for the stamp feeding and related mechanisms is accordingly made of elongated form vertically so that it will maintain the driving relation with the gear 41 irrespective of the vertical positions into which the plate 137 may be adjusted.

The shaft 44 (Fig. 3) is connected by a chain 250 to a vacuum pump 251 which is of the reciprocating type having a piston 252, an air exhaust and air discharge valve 253 and an inlet check valve 254, the latter being connected to the flexible host 131 attached to the suction plate 127, the pump being driven so that it makes one revolution to each cycle of the machine, each suction stroke of the pump being timed to take place immediately prior to the swing of the magazine toward the gripper wheel, whereby a suction will be produced at the aperture 128 which will hold the adjacent end of the lowermost stamp in contact with the suction plate as the magazine swings, thereby separating the lowermost stamp from the rest of the stamps in the stack. A spring finger 126ª attached at its upper end to the front of the magazine and having its lower end inturned supports the stack of stamps above the one separated therefrom.

A revoluble gripper cooperates with the suction plate of the magazine to remove the stamps successively therefrom. This gripper, as shown in detail in Figs. 7 to 15 inclusive and 17 to 22 inclusive, comprises a substantially circular wheel or disk 165 which is suitably fixed to the shaft 145 and is located adjacent to the suction plate. The wheel or disk 165 is grooved circumferentially, as shown at 166, and the major portion of its periphery is circular and provides a pair of stamp supporting edges 167 on its periphery which are preferably recessed at their outer sides to operate in a channel formed between a pair of stamp guides 168 supported by a loke 168ª, a portion of these guides extending from the top of the gripper to the bottom thereof, concentrically of the gripper, and a continuation of these guides forming horizontal tangential extensions 169 supported in properly spaced relation by a bracket 169a, as shown in Fig. 17. These stamp guides have grooves 170 in their inner faces which, in the curved portions of these guides, are concentric with the periphery of the gripper wheel 165 and are directly opposite to the stamp supporting surfaces 167 thereon, as shown in Fig. 22, and these grooves 170 extend longitudinally along the inner sides of the guide extensions 169. The grooves 170 form channels in which the edges of the stamps are guided to travel as they are withdrawn from the magazine, it being understood that the grooves are spaced apart a distance slightly greater than the width of the stamps. A portion of the periphery of the gripper wheel 165 is notched at 171 and this notch has a jaw 172 fixed therein to extend transversely of the gripper wheel. A gripping finger 173 is mounted to swing in the groove 166 at the notched side of the gripper wheel, this finger being fixed to a shaft 174 which is mounted rotatably in the gripper wheel and is provided with an operating arm 175 which is fixed thereto and carries a controlling roller 176. The end of the finger 173 has a jaw 177 thereon which is adapted to engage the relatively fixed jaw 172 in the gripper wheel, and a tension spring 178 attached at one end to the finger 173 and at its other end to a relatively fixed pin 179 in the gripper wheel tends to swing the jaw 177 into engagement with the jaw 172 and thereby grip the end of a stamp between them. The operation of the gripper finger 173 is controlled by a cam 180 which is fixed by a set screw or other suitable means in the bearing 181 in the bracket 150, the shaft 145 being rotatable centrally of this cam, and the roller 176 controlling the gripper finger riding around the periphery of this cam and being held in contact therewith by the spring 178 as the gripper revolves. The cam 180 is of such a shape and it is so set relatively to the gripper finger as to cause the gripper finger to drop onto the jaw 172 when the gripper finger reaches the top of the gripper wheel, as shown in Fig. 17, and to remain in contact with the jaw 172 until the gripper finger passes the lower side of the gripper wheel at which time the gripper finger will be retracted from the jaw 172, as shown in Fig. 19.

The stamp magazine is so located relatively to the gripper wheel and the cam 148 is shaped to so oscillate the magazine as to cause the suction plate 127 to separate an end of the lowermost stamp in the magazine from the stack and to introduce the end of the stamp into a position to be gripped between the jaw 172 and the gripper finger 173 while the gripper revolves continuously, the rotation of the gripper wheel acting to withdraw the gripped stamp endwise from the magazine, after which the magazine retracts from the gripper wheel. This operation takes place at each revolution of the gripper wheel. As shown in Fig. 16 the stamp magazine is in its normal retracted position and the gripper wheel 165 has reached the position shown in this figure in its rotation. As the gripper wheel continues to revolve, the cam 148 swings the magazine on the shaft 138 as a center so that the suction plate 127 approaches the top of the gripper wheel. During this swing of the magazine, the bottom thereof is tilted upwardly but the suction plate 127 is maintained in a horizontal position by the action of the cam 152 on the cam roller 135, in consequence of which the end of the lowermost stamp adjacent to the gripper wheel is separated from the remainder of the stamps in the magazine, the end of the stamp projecting slightly beyond the free end of the suction plate, and the suction plate, which is sufficiently narrow, enters the circumferential groove 166 in the gripper wheel behind the jaw 172. A moment later, as the jaw 172 reaches its uppermost position as shown in Fig. 15, the suction plate 127, due to the speed at which the magazine is oscillated, will have substantially overtaken the jaw 172 and brought the end of the stamp into a position to overlie it, at which moment the gripper finger 173 is allowed to drop by the cam 180 onto the end of the stamp and to thereby grip it between the jaw 177 on the gripper finger and the jaw 172 under the action of the spring 178, as shown in Fig. 17. The stamp gripped by the jaws 172 and 173 is carried, by the rotation of the gripper wheel 165, from the upper side thereof around the curved guides 168 and to the lower side of the gripper wheel, the stamp being guided by the circular rims 167 on the gripper wheel on which the stamp rests and by the grooves 170 in the guides in which the edges of the stamp travel. The stamp is thus drawn by the gripper wheel from the magazine by its leading end, and when this end of the stamp reaches the lower side of the gripper wheel it is engaged by means which transfers the stamp from the gripper wheel to the devices previously described which apply and affix the stamps to the bottles.

The stamp transferring means provided by the present invention comprises an endless chain 185 which may be an ordinary roller chain, this chain passing around the sprocket 82 on which the stamp applying and affixing devices are mounted and around an idler sprocket 186 which is rotatable on a vertical shaft supported by a bracket 187 which fits in gibs 188 on the underside of the plate 137, an adjusting screw 189 being mounted on the plate 137 and arranged to operate upon the bearing bracket 187 to adjust the sprocket 186 to take up slack or adjust the tension of the chain. The chain 185 carries at intervals along its length a series of stamp carriers 190 all of which may be of the same construction, each carrier having a saddle portion 191 by means of which it is bolted or otherwise fixed to links in the chain 185, and each carrier is in the form of a yoke having guiding fingers 192 projecting from one side thereof, and having a pair of shafts 193 rotatably mounted in the yoke near its ends, these shafts carrying hook like pins or needles 194. Each shaft 193 is provided with a spring 195 which acts thereon to swing its respective pin upwardly, and each shaft is provided with a block 196 which is fixed thereon and has an arm arranged to engage the respective yoke arm 192 and thereby arrest the swing of the pins when they assume substantially vertical positions. One of the shafts 193 has a cam 197 fixed thereon which is turned upwardly, and the other shaft 193 has a cam 198 fixed thereon and which is turned downwardly. The chain 185 and the stamp carriers thereon are guided as they travel between the idler sprocket 186 and the sprocket 82 by rails 199 which are supported by brackets 200 fixed to a plate 201, the latter being supported rigidly from the plate 137 by a suitable number of rods 202. The chain during its travel passes between the rails 199 while the yokes 190 are suspended beneath these rails, and the arms 192 of the yokes ride on rails 203 which are mounted on the plate 201, as shown in Fig. 8. Normally, and as the stamp carrying yokes approach the gripper wheel 165, the pins 194 will be upturned and held in such position by the springs 195. As the leading pin on a yoke passes beneath the gripper wheel 165, the pin 194 on its leading end will project above the plane of the leading end of the stamp as it is brought to the lower side of the gripper wheel 165 and, while the leading end of the stamp is still gripped by the jaws 172 and 177, this pin will pierce the leading end of the stamp, immediately following which the gripper finger 173 is opened to release the leading end of the stamp, as shown in Fig. 19. The chain 185 and the stamp carrying yokes thereon are driven from the sprocket 82 so that they will advance at the same peripheral speed as that of the gripper wheel 165, and after the leading end of the stamp has been released by the gripper wheel the stamp is drawn through the curved guides 168 and then through the straight guide extensions 169 by the pins 194 on which it is impaled, the stamp being guided by its edges which engage in the grooves in the guide extensions 169, and when the rear or trailing end of the stamp approaches a point directly beneath the gripper wheel, the trailing pin 194 is retracted or lowered by engagement of its depending cam 198 which comes into contact with a cam 205 which is located in its path, thereby causing this trailing pin to be lowered and as it reaches a point directly beneath the center of the gripper wheel 165, the cam 196 reaches the end of the cam 205 and the spring 195 is thereby caused to snap this pin upwardly so as to pierce the trailing end of the stamp, as shown in Fig. 17. Fig. 7 shows the cam 198 as it is riding on the cam 205. In order to prevent damage to the stamp carrying mechanism in the event the machine is turned backwardly for inspection, adjustment or other purposes, the cam 205 is carried by a plate 206 which is pivotally connected to the upper ends of a pair of parallel links 207, the lower ends of these links being pivotally mounted on plates 208 attached to the underside of the plate 201. The plate 206 is normally held in its raised operative position against a stop pin 209 by a tension spring 210, this spring however being yieldable to permit downward deflection of the cam 205 should the stamp carrier chain be moved backwardly.

The stamp, impaled upon and thus suspended between the upturned pins 194 of the stamp carrier, is conveyed by the chain 185 to the periphery of the sprocket 82, and as each stamp carrying yoke commences its travel around the periphery of the sprocket 82 it introduces the stamp between the top of a bottle as the same is fed onto the turntable 29 by the turnstile 55 and one of the stamp applying and affixing devices of the annular series which rotate with the turntable, the stamp being introduced so that it lies directly beneath the head 89 between its flanges 91 and lengthwise directly beneath the space between the plates 103, as shown in Fig. 6, it being understood that at this time the respective stamp applying and affixing device is in its fully elevated position. The moment the head 89 has descended and pressed the middle of the stamp upon the top or mouth of the bottle, as shown in Fig. 33, the pins 194 are retracted to release the ends of the stamp. This releasing means is shown in detail in Figs. 23 and 24. It comprises a plate 210 bolted or otherwise fixed to the outer chain guiding rail 199 and having a pin 211 located in the path of the cam 197 on the shaft of the leading pin 194 so that as this cam engages the pin 211, the leading pin 94 is swung downwardly, thereby retracting this pin from the leading end of the stamp. Another plate 212 is bolted or otherwise fixed to the outer chain guiding rail 199 and this plate carries a pin 213 which is arranged in the path of the downturned cam 198 on the shaft of the trailing pin 194 so that as the stamp carrier advances this cam will engage the pin 213 and will be deflected thereby in a direction to retract the trailing pin 194, thereby releasing it from the trailing end of the stamp. The pins 211 and 213 are preferably so located as to cause both pins to be simultaneously retracted to release both ends of the stamp. In order to avoid damage to the stamp carrying mechanism in the event the machine is turned backwardly for inspection, adjustment or other purposes, the pins 211 and 213 are carried by levers 214 and 215 respectively which are pivoted at 216 and 217 respectively on the plates 210 and 212, the pins 211 and 213 operating in slots 218 and 219 in the respective plates and tension springs 220 and 221 normally holding the pins against the forward ends of the slots as shown in Fig. 23, reverse movement of the chain 195 however causing the pins 211 and 213 to be deflected in the slots and thereby permit the cams 197 and 198 to pass the pins 211 and 213 without obstruction.

As each stamp is drawn around the gripper wheel 165 it is provided with a strip of glue or other adhesive on that side of the stamp which is to be applied to the bottle. The glue applying means, which is shown more particularly in Figs. 7 and 9, comprises a segmental glue transfer roll 225 which is fixed to a shaft 226 journalled in a bracket 227, the roll 225 being located to operate between the curved guides 168 and to bear on and apply a strip of glue or adhesive longitudinally to the portion of the stamp which is exposed between these guides. The glue transfer roll 225 is driven from the shaft 145 by a gear 228 fixed on said shaft and meshing with a gear 229 fixed on the glue roll shaft 226. In order to enable the glue transfer roll to be adjusted relatively to the gripper wheel and the stamp thereon, the bracket 227 which carries the glue transfer roll is pivoted at 230 to a bracket 231 which is bolted or otherwise fixed to the underside of the plate 137, a portion of the pivoted bracket 227 projecting to one side of the pivot 230 and being acted upon by a compression spring 232 between it and the bracket 231, and an adjusting screw 233 is threaded through the plate 137 and bears on a portion of the bracket 227 at the opposite side of the pivot 230, adjustment of the screw 233 in one or the other direction moving the glue transfer roll 225 toward or from the periphery of the gripper wheel 165. The glue transfer roll receives glue or adhesive from a glue roll 235 which rotates in contact therewith. This glue roll is fixed on a shaft 236 which is journalled in a bracket 237, the latter being slidable on gibs 238 secured to the underside of the plate 137 so that the glue roll 235 may be adjusted toward and from the glue transfer roll 225. The glue roll 235 is provided with suitable means for supplying it with glue or other adhesive, a glue pot 240 being shown in the present instance which is of cylindrical form and having lugs 241 at its ends which are slidable adjustably in slots 242 in the bracket 237, the glue pot having a slot 243 in a side into which the periphery of the glue roll 235 may extend and thereby pick up glue or adhesive from the pot, and the pot being adjustable toward and from the glue roll by a pair of screws 244 threaded in the bracket 237 and bearing on the lugs 241, compression springs 245 bearing on the opposite sides of the lugs 241 and holding them in engagement with the screws. The glue roll and glue pot as a whole are adjustable toward and from the glue transfer roll 225 by a screw 246 which is mounted rotatably in the bracket 237 and threaded into the gib 238 on the underside of the plate 137.

If desired, means may be employed for moistening the stamps before they are applied to the bottles in order to soften the stamps and thus render them more pliable and thereby facilitate their application to the bottles so that they will lie in intimate relation with the bottles. Such means may consist of a brush 260 (Fig. 7) mounted above the path of travel of the stamps as they are advanced by the chain 185 toward the bottles, this brush being located in a position to brush over the stamps as they are suspended between and advanced endwise by the pins 194, and supplied with water at a suitably slow rate through a hose 261 leading from a suitable reservoir 262.

The construction and operation of the different mechanisms of the machine having been described in detail, the general operation of the machine is as follows: The bottles B to be stamped are placed in any suitable way on the travelling bottle conveyor 16 at the left hand end of the machine as shown in Figs. 1 and 2 and between the guide rails 25 so that the bottles are in upright position and in a row thereon, and the stamps are stacked in the stamp magazine. The bottle conveyor is driven continuously to convey the bottles from the left toward the right in Figs. 1 and 2 by the motor 47 which also operates to rotate the turntable 27 and the sprocket 82 continuously and to also drive the stamp feeding shaft 145 continuously as well as to operate the pump 251 continuously. As the bottles approach the intake turnstile 55, which is driven continuously from the turntable, the escapement 65 moves into and out of the path of the bottles, thereby spacing them for engagement by the turnstile 55. This turnstile feeds the bottles successively around the curved portions 25ª of the guide rails onto the turntable while the latter revolves, thereby placing the bottles on the turntable in an annular row, and as the stamp applying and affixing devices carried by the sprocket 82 are also rotated in unison with the turntable and are spaced circumferentially thereof at intervals corresponding to the intervals at which the bottles are placed on the turntable by the turnstile 55, the bottles will be placed on the turntable in positions immediately beneath the respective stamp applying and affixing devices.

The stamp conveyor chain 185, which is driven from the sprocket 82 and hence at a speed corresponding with the speed of rotation of the row of bottles and the stamp applying and affixing devices, is supplied with gummed stamps A successively by the gripper wheel, the stamps being impaled upon the pins 194 so that they are suspended between these pins, and the stamp conveyor chain carries the stamps to the stamp applying and affixing devices in a path which is tangential to the circular path of rotation of said devices, the stamps being thus introduced successively between the top of each bottle on the turntable and the respective stamp applying and affixing device.

As the stamp applying and affixing devices rotate around the cam 96, the head 99 of the device beneath which the stamp has just been introduced is first lowered to press the middle of the stamp on the top of the bottle, immediately following which the pins 211 and 213 operate upon the stamp carrying pins 194, incident to the travel of the chain 185, and retract or withdraw them from the ends of the stamp, thereby releasing the ends of the stamp for application to the bottle. The immediately following portion of the rotation of this stamp applying and affixing device causes the presser arms 105 to bend the ends of the stamp down at opposite sides of the bottle neck by the presser arms 105 while guided laterally by the guide plates 103, as shown in Figs. 33 and 34, and the final operation of the stamp applying and affixing device causes the presser arms to clamp the ends of the stamp firmly and intimately against the opposite sides of the bottle neck for affixing the stamp thereto, as shown in Fig. 35.

Each stamp applying and affixing device is held by the cam 96 in its fully lowered position to maintain the presser arms 105 in clamping relation with the stamp ends, during the rest of the rotation of the turntable, until the bottle reaches the curved portions 39ª of the guide rails, whereupon the stamp applying and affixing device is operated to first unclamp the presser arms 105 from the bottle and to then lift the presser arms from the bottle. The stamped bottle is then engaged by the discharge turnstile 64, which is driven from the turntable, and this turnstile removes the stamped bottle from the turntable and returns it to the bottle conveyor 16, and the stamped bottle is conducted by this conveyor to the discharge end of the machine where it may be received on a table for packing, or otherwise disposed of.

Since the sprocket 82 carrying the stamp applying and affixing devices is supported on and movable vertically with the shaft 39 which is fixed to the vertically adjustable auxiliary frame 3, and the stamp feeding, gumming and transferring means are supported on the plate 137 which is fixed to the vertically adjustable auxiliary frame 3 by the rods 158, braces 159 and collar 160, it will be seen that the machine may be readily adjusted for the stamping of bottles of different sizes or heights by merely rotating the crank 12 which operates to adjust the auxiliary frame 3 vertically, the stamp feeding means and its associated gumming means, the stamp transferring means and the stamp applying and affixing devices being thus adjustable to different heights above the bottle conveyor 16 and bottle supporting turntable while the driving connections for the mechanisms carried by the auxiliary frame are maintained with the driving means on the main frame.

In the machine shown in the present instance, twelve stamp applying and affixing devices are employed and, accordingly, the driving gearing is so designed that each half revolution of the gear 41 meshing with the turntable gear 35 will rotate the turntable and the stamp applying and affixing devices one-twelfth of a revolution, and will rotate the shafts 144 and 156 one complete revolution to perform a stamp feeding cycle, and the vacuum pump 251 will be operated on its suction stroke once during each revolution of the shaft 144, and the turntable gear 35, during each one-twelfth revolution, will rotate the double armed bottle intake and discharge turnstiles 55 and 64 one-half revolution to introduce a bottle to and discharge a bottle from the turntable, and will rotate the double cam 74 one-half revolution to actuate the escapement arm 65 once. It will be understood that a greater or less number of stamp applying and affixing devices may be embodied in the machine, and the driving gearing proportioned accordingly.

The present invention provides a machine which is capable of rapidly, uniformly and effectively applying stamps to bottles, or for performing similar operations. The machine operates continuously and therefore smoothly and with maximum capacity, all of the mechanisms being coordinated so as to perform their operations without the necessity of interrupting the advance of the bottles.

By placing the bottles in an annular row on a turntable with which the annular row of stamp applying and affixing devices rotates, the stamp applying and affixing operations are performed while the bottles continue to advance, and, moreover, this arrangement and mode of operation enable the stamps to be firmly clamped to the bottles until they are ready to be discharged from the turntable, thus affording ample time for the glue or adhesive on the stamps to set and firmly affix the stamps to the bottles.

The means for transferring the stamps from the stamp feeding means to the bottles on the turntable not only enables the stamps to be readily brought into applying position between the bottles and their affixing devices, but by carrying the stamps endwise while suspended by their ends on carrying pins, applying of the stamps uniformly and evenly to the bottles is ensured, the guiding of the stamps onto the bottles being further assisted by the guide plates on the stamp applying and affixing devices. By withdrawing the pins from the ends of the stamp immediately after the stamp applying and affixing device has pressed the center of the stamp on the top or mouth of the bottle, the stamp is released from its carrier without tearing and thus mutilating the ends of the stamps.

The stamp feeding means, including guides to engage the edges of the stamps and thereby guide them while they are being conducted by the gripper wheel to the stamp transferring means, insures the placing of the stamps in properly alined position on the carrying pins, and such alinement of the stamps is maintained until the stamps are placed on the bottles.

The devices for applying and affixing the stamps to the bottles insure the affixing of the centers of the stamps to the tops or mouths of the bottles and the application of the ends of the stamps to the sides of the bottle necks. By applying the clamping pressure to the stamp ends after the presser arms have been fully lowered, and holding the presser arms in their fully lowered position until after the clamping action thereof has been released, disturbance of the ends of the stamps is avoided.

Although the machine herein described is a bottle stamping machine, and the machine is especially adapted for applying and affixing stamps such as revenue stamps to the tops of bottles, it will be evident that machines constructed in accordance with the present invention may be employed for applying and affixing labels or similar objects to bottles and other articles, and it is to be understood that, in the broader aspects of the invention, references in this specification and in the claims to stamps are intended to include such labels or similar strip-like objects, and that the invention is not limited to the stamping or labelling of bottles but is applicable to containers of other kinds and to other articles to which such strip-like objects are to be applied.

The means for feeding the stamps or the like from the magazine, applying adhesive thereto and for conveying the stamps or the like from the feeding means are claimed in a divisional application filed March 12, 1941, Serial No. 383,035.

I claim:

1. A bottle stamper comprising means for advancing bottles continuously, means for feeding stamps and for suspending them by their ends across the tops of the bottles while they are advancing, and means for applying and affixing the stamps to the tops of the bottles and for holding the stamps in affixed relation while the bottles are advancing.

2. A bottle stamper comprising a turntable, means for feeding bottles in upright position to the turntable for rotation therewith, means for feeding a stamp gummed on one side to each bottle, means for moistening the ungummed side of the stamp during the feeding thereof, and a device rotatable with the turntable and operative to affix the stamp to the bottle thereon and to hold the stamp in affixed position on the bottle during its rotation.

3. A bottle stamper comprising a turntable, an annular series of stamp affixing devices rotatable with the turntable, means for feeding bottles in upright position successively to said stamp affixing devices, means for feeding stamps endwise and in suspended position above the tops of the bottles during rotation of the turntable, and means for operating said devices to apply and affix the stamps to the tops of the respective bottles and to hold the stamps in affixed relation thereto.

4. A bottle stamper comprising a conveyor for advancing a row of bottles, a turntable located at a side of the conveyor, means for transferring the bottles laterally from the conveyor onto the turntable for rotation in an annular path thereon, means for suspending stamps by their ends and feeding them to the bottles on the turntable, an annular series of devices rotatable with the turntable and operative to affix the stamps to the bottles as they are rotated thereby, and means for removing the stamped bottles from the turntable and returning them to said conveyor.

5. A bottle stamper comprising a turntable, an annular series of stamp applying devices rotatable with the turntable, a turnstile operative to feed bottles in upright position successively to the turntable into positions for operation thereon by said devices, means in advance of said turnstile for indexing the bottles for engagement thereby and a turnstile operative to remove the bottles successively from the turntable.

6. A bottle stamper comprising a turntable, an annular series of stamp applying devices rotatable with the turntable, a turnstile operative to feed bottles in upright position successively to the turntable into positions for operation thereon by said devices, an escapement connected to and operative in timed relation with said turnstile and engageable with the bottles for indexing them for engagement by said turnstile, and a turnstile operative to remove the bottles successively from the turntable.

7. A bottle stamper comprising a turntable for rotating an annular series of bottles, an annular series of stamp applying and affixing devices rotatable with the turntable and the series of bottles thereon, means travelling in a path concentric with the turnstile for supplying stamps to said devices, and means including a cam concentric with the axis of the turntable and around which said devices travel for operating said devices to apply and affix stamps to the bottles.

8. A bottle stamper comprising a turntable, means for feeding bottles thereto for rotation in an annular series thereon, an annular series of stamp applying and affixing devices mounted to rotate with the turntable and the bottles thereon, and means for feeding stamps to the bottles in a path substantially tangential to the annular series of bottles and stamp applying devices.

9. A bottle stamper comprising a turntable for rotating an annular series of bottles supported thereon, an annular series of stamp applying and affixing devices mounted above and rotatable with the turntable, and a stamp conveyor travelling in a path concentric with the turntable for feeding stamps to the bottles thereon for affixing thereto by the respective stamp applying and affixing devices.

10. A bottle stamper comprising means for supporting a bottle in stamping position, a device for applying and affixing a stamp thereto, and a stamp carrier comprising pins for suspending a stamp by its ends and for introducing the stamp between the bottle and said applying and affixing device.

11. A bottle stamper comprising means for supporting a bottle in stamping position, a device for applying and affixing a stamp thereto, and a travelling carrier having impaling pins for suspending a stamp by its ends and thereby bringing it into position for application to the bottle, and means for retracting said pins to release the stamp.

12. A bottle stamper comprising means for supporting a bottle in stamping position, a device for applying and affixing a stamp thereto, and a travelling carrier having impaling pins for suspending a stamp by its ends and thereby bringing it into position for application to the bottle, and means for retracting said pins to release the stamp, said retracting means being yieldable into inactive position when said carrier is moved backwardly.

13. A machine of the class described comprising a turntable for supporting an article for stamping, a stamp applying and affixing device rotatable with the turntable for operation upon the article, a stamp carrier travelling with the turntable and having impaling pins for suspending a stamp by its ends and movable in a path to carry the stamp into position for application to the article, means for operating said device to apply and affix the stamp to the article, and means operative during the travel of the stamp carrier and after engagement of the stamp by said device for retracting said pins to release the stamp.

14. A machine of the class described comprising a turntable to receive and advance an annular series of articles, an annular series of devices mounted above and rotatable with the turntable and operative to apply and affix stamps to the articles, a stamp feeding device, stamp transferring means operative to receive stamps from the stamp feeding means and suspend them by their ends and to position them between the articles on the turntable and the respective stamp applying and affixing devices, and means for operating said stamp transferring means to release the stamps therefrom after their reception by the stamp applying and releasing devices.

15. A machine of the class described comprising a turntable to receive and advance an annular series of articles, a member rotatable with the turntable, an annular series of stamp applying and affixing devices carried by said member, stamp feeding means, and means for transferring stamps from said feeding means to said devices comprising a travelling conveyor operative to receive the stamps from the feeding means and guided to travel around said rotatable member.

16. A bottle stamper comprising a turntable to support and advance an annular row of bottles in upright position, a sprocket mounted above and connected to the turntable to rotate therewith, an annular series of stamp applying and affixing devices carried by said sprocket, stamp feeding means, and means for transferring stamps from said feeding means to said devices including a travelling conveyor having stamp carrying means thereon and engaging and passing around said sprocket.

17. A machine of the class described comprising a turntable for supporting an annular row of articles, a sprocket mounted above the turntable and having means for rotating it in unison therewith, stamp feeding means, an endless chain passing around said sprocket and having stamp carrying devices thereon for conveying stamps to said articles, means for operating said stamp carrying devices to receive stamps from said feeding means, devices rotatable with the turntable and operative to apply and affix the stamps to the articles, and means for operating the stamp carrying devices to release the stamps therefrom after they have been engaged by the stamp applying and affixing devices.

18. A machine of the class described comprising a support for advancing a series of articles in an annular row, an annular series of devices mounted for rotation in cooperative relation with said articles and operative to apply stamps thereto, and an endless conveyor having a portion thereof arranged to travel with and concentrically of said series of devices and having carriers thereon for respectively supplying stamps to said devices.

19. A machine of the class described comprising a turntable for supporting and advancing an annular row of articles, an annular series of devices for applying stamps to said articles, a sprocket supporting said devices in cooperative relation with the turntable and having means for driving it in unison with the turntable, an endless conveyor arranged to travel around said sprocket and having carriers thereon for conveying stamps and introducing them to said devices, and means operative during the travel of said conveyor for releasing the stamp from each carrier thereon when such stamp has been introduced to its respective applying device.

20. A stamping machine comprising article supporting and advancing means, stamp applying and affixing means above the article supporting and advancing means and adapted to travel therewith, and a common support for adjusting said stamp applying and affixing means relatively to said article supporting and advancing means to accommodate articles of different sizes.

21. A stamping machine comprising a turntable for supporting and advancing articles in an annular row, stamp feeding devices, an annular row of devices for receiving and applying and affixing the stamps to the tops of articles on the turntable, means for rotating said stamp feeding and applying and affixing devices in unison with the turntable, and means supporting said stamp feeding and applying and affixing devices for simultaneous adjustment relatively to the turntable to accommodate articles of different sizes.

22. A machine of the class described comprising an article supporting turntable, means for feeding articles to and discharging them from the turntable, devices mounted to travel with and operative to apply stamps to articles on the turntable, means for supplying stamps to said devices, common supporting means for said stamp applying devices and stamp supplying means adjustable relatively to said turntable and article feeding and discharging means to accommodate articles of different sizes.

23. A machine of the class described comprising a main frame, a turntable and a travelling conveyor mounted on the main frame, the conveyor being operative to convey articles to and from the turntable and the turntable being operative to advance the articles in an annular row, an auxiliary frame adjustable vertically relatively to the main frame, stamp applying devices mounted on and adjustable with the auxiliary frame to cooperate with articles of different sizes on the turntable, and means also mounted on the auxiliary frame and adjustable thereby for supplying stamps to said stamp applying devices in accordance with the different positions of adjustment thereof.

24. A machine of the class described comprising a turntable for advancing a series of articles in an annular row, an annular series of stamp applying devices mounted opposite the turntable to rotate concentrically therewith and to cooperate with a row of articles thereon and having a driving connection with the turntable for rotation in unison therewith, and a stamp conveyor having a driving connection with said devices for travel concentrically therewith and having stamp carriers thereon for supplying stamps to said devices.

25. A machine of the class described comprising a main frame, a turntable and a travelling conveyor mounted on the main frame, the conveyor being operative to convey articles to and from the turntable and the turntable being operative to advance the articles in an annular row, an auxiliary frame adjustable vertically relatively to the main frame, stamp applying devices mounted on the auxiliary frame to cooperate with articles on the turntable, means also mounted on the auxiliary frame and adjustable thereby in accordance with adjustments of said stamp applying devices for supplying stamps to said devices, means on the main frame for driving the turntable and conveyor, means on the auxiliary frame for driving the stamp applying devices and stamp supplying devices, and means for maintaining a driving connection between the driving means on the main and auxiliary frames while the latter is in different adjusted positions.

26. A stamp applying and affixing device comprising a head for pressing the middle of a stamp against an article, a pair of presser members to engage the ends of the stamp, and common operating means for moving said head and the portion of the stamp engaged thereby against the article and for subsequently moving the presser members toward an article and toward one another to apply and clamp the ends of the stamp to the article, and for thereafter releasing the clamping action of said members and subsequently retracting them from the article and finally retracting said head from the article.

27. A stamp applying and affixing device comprising a head to engage a stamp between its ends, a pair of presser members to engage the ends of the stamp, and means common to said head and presser members for moving said head toward an article to press the portion of the stamp engaged thereby against the article, and for subsequently moving the presser members toward the article and toward one another to apply and clamp the ends of the stamp to the article, and for thereafter releasing the clamping action of said members and subsequently retracting them and finally retracting said head from the article.

28. In a machine of the class described, the combination of a conveyor having a carrier thereon provided with means for engaging the ends of a stamp and advancing it endwise, and an applying and affixing device having presser members engageable with the ends of the stamp and operative to apply them to an article, and guides at the sides of said presser members for guiding the ends of the stamp.

29. In a machine of the class described, the combination of a conveyor having means thereon for advancing a stamp, and an applying and affixing device to receive the stamp, said device including a head having guides thereon engageable with an article to be stamped to position it relatively to said device, and having a surface engageable with a portion of the stamp between its ends for pressing such portion of the stamp onto an article, and presser members having guides at their sides for guiding the ends of the stamp toward the article, the presser members being operative to press the ends of the stamp against opposite sides of the article.

RICHARD C. TALBOT.